US010437178B2

(12) United States Patent
Shimazu

(10) Patent No.: US 10,437,178 B2
(45) Date of Patent: Oct. 8, 2019

(54) IMAGE FORMING APPARATUS AND NON-TRANSITORY RECORDING MEDIUM STORING COMPUTER READABLE PROGRAM

(71) Applicant: Konica Minolta, Inc., Chiyoda-ku, Tokyo (JP)

(72) Inventor: Akihiko Shimazu, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/031,513

(22) Filed: Jul. 10, 2018

(65) Prior Publication Data

US 2019/0011861 A1 Jan. 10, 2019

(30) Foreign Application Priority Data

Jul. 10, 2017 (JP) ................................ 2017-134547

(51) Int. Cl.

| | |
|---|---|
| ***G03G 15/16*** | (2006.01) |
| ***B65G 15/30*** | (2006.01) |
| ***G03G 15/20*** | (2006.01) |
| ***G03G 15/00*** | (2006.01) |

(52) U.S. Cl.

CPC .......... *G03G 15/161* (2013.01); *B65G 15/30* (2013.01); *G03G 15/167* (2013.01); *G03G 15/2028* (2013.01); *G03G 15/553* (2013.01); *G03G 15/5054* (2013.01)

(58) Field of Classification Search

CPC ....... G03G 15/14–162; G03G 15/1665; G03G 15/167; G03G 15/5054; G03G 15/553; G03G 2215/00139; G03G 2215/00156–00168

See application file for complete search history.

(56) References Cited

U.S. PATENT DOCUMENTS

2013/0279921 A1* 10/2013 Kanai .................... G03G 15/50 399/12
2017/0269515 A1* 9/2017 Nakamura ........... G03G 15/553

FOREIGN PATENT DOCUMENTS

JP 09309642 A * 12/1997
JP 2010107659 A 5/2010

OTHER PUBLICATIONS

Machine Translation of JP 2010-107659. May 13, 2010. (Year: 2010).*

* cited by examiner

*Primary Examiner* — Carla J Therrien
(74) *Attorney, Agent, or Firm* — Cantor Colburn LLP

(57) ABSTRACT

An image forming apparatus which forms an image on a recording medium, includes: a belt which is endless and rotationally driven; a drive roller which is wound around the belt to rotationally drive the belt; a position detector which is arranged along an axial direction of the drive roller to detect deviation of the belt; a steering roller which is wound around the belt and corrects the deviation of the belt detected by the position detector; and a controller which controls the steering roller, wherein the controller determines a deterioration state of the belt based on a change amount linked with change of a friction coefficient of the belt until a predetermined period elapses after starting use of the belt.

12 Claims, 6 Drawing Sheets

START
S11 ENTER INITIALIZATION MODE
S12 START STEERING MOVEMENT OF BELT
S13 DETECT MOVING POSITION OF BELT
S14 IS THRUST LOAD OF BELT DETECTED ? (Y / N)
S15 DETECT THRUST LOAD OF BELT
S16 DOES MEASUREMENT TIME END ? (Y / N)
S17 CALCULATE MOVEMENT TIME OF BELT BASED ON DETECTION RESULTS
S18 CALCULATE RATIO OF MOVEMENT TIMES
S19 IS DIFFERENCE BETWEEN MOVEMENT TIMES CALCULATED (Y / N)
S20 CALCULATE DIFFERENCE BETWEEN MOVEMENT TIMES
S21 STORE CALCULATION RESULTS AND DETECTION RESULTS AS INITIAL VALUES
END 1
110
ADF
10a
111
INTERFACE UNIT
IMAGE READING UNIT
10b
113
CPU
IMAGE FORMING UNIT
30
MEMORY
CONTROLLER
114
STEERING
DRIVE UNIT
202
115
STORAGE
ROLLER DRIVE UNIT
201
OPERATION PANEL
160
DISPLAY UNIT
161
701
POSITION
DETECTOR
OPERATION UNIT
163
TOUCH PANEL
165
702
POSITION
DETECTOR
HARDWARE KEY UNIT
167
703
LOAD
DETECTOR
101

IMAGE FORMING APPARATUS AND NON-TRANSITORY RECORDING MEDIUM STORING COMPUTER READABLE PROGRAM

CROSS REFERENCE TO RELATED APPLICATION

The present application claims priority under 35 U.S.C. § 119 to Japanese Application No. 2017-134547 filed Jul. 10, 2017, the entire content of which is incorporated herein by reference.

BACKGROUND

Technological Field

The present invention relates to an image forming apparatus and a non-transitory recording medium storing a computer readable program.

Description of the Related Art

In recent years, multi-functional image forming apparatuses that combine the functions of a printer, scanner, copier, fax and the like have been broadly used. In the image forming apparatus, when conveying a recording medium by the use of a belt, the belt may deviate from its correct position. The image forming apparatus is thereby provided with a steering mechanism which corrects deviation of the belt when such deviation occurs. It is proposed to switch swing type control to equilibrium point control in such an image forming apparatus provided with a steering mechanism when a particular condition is satisfied (for example, refer to Japanese Unexamined Patent Application Publication No. 2010-107659).

SUMMARY

However, in the case of the prior art technique described in Japanese Unexamined Patent Application Publication No. 2010-107659, the deterioration state of a belt is determined on the basis of the time required for the steering movement of the belt at a certain point in time after starting conveyance of the recording medium on the belt, and the time required for the steering movement of the belt when a predetermined time further elapses after the certain point. Accordingly, in the case of the prior art technique described in Japanese Unexamined Patent Application Publication No. 2010-107659, even if bleeding of a belt occurs to increase the friction coefficient μ of the belt, change in the friction coefficient μ, of the belt cannot be detected just after the belt bleeding occurs. Because of this, if the steering movement of the belt continues, the friction coefficient μ of the belt increases due to the bleeding to increase the stress applied to the belt during the steering movement so that the creep deformation of the belt may occur. In other words, in the case of the prior art technique described in Japanese Unexamined Patent Application Publication No. 2010-107659, it is impossible to appropriately determine replacement timing of a belt.

Taking into consideration the above circumstances, it is an object of the present disclosure therefore to appropriately determine replacement timing of a belt.

To achieve at least one of the abovementioned objects, according to an aspect of the present invention, an image forming apparatus which forms an image on a recording medium, comprises: a belt which is endless and rotationally driven; a drive roller which is wound around the belt to rotationally drive the belt; a position detector which is arranged along an axial direction of the drive roller to detect deviation of the belt; a steering roller which is wound around the belt and corrects the deviation of the belt detected by the position detector; and a controller which controls the steering roller, wherein the controller determines a deterioration state of the belt based on a change amount linked with change of a friction coefficient of the belt until a predetermined period elapses after starting use of the belt.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present disclosure will be described with reference to the drawings. However, the scope of the present disclosure is not limited to the following embodiments. Incidentally, as used in the detailed description of the embodiments, the terms "comprise," "consist of," "include," "including," "have," "incorporate," and any synonyms thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Furthermore, unless otherwise specifically indicated, the term "or" represents "inclusive or" but does not means "exclusive or". For example, "condition A or condition B" is true in any of the case that condition A is true and condition B is false, the case that condition A is false and condition B is true, and the case that condition A is true and condition B is true.

The present disclosure is related also to the apparatus that performs processing as described herein. Such an apparatus may specifically be built for the intended purpose, or may be built as a general purpose computer which is selectively activated or reconfigured by a computer program stored in the computer.

Also, the algorithm as explained here does not require a particular computer or apparatus. Various general purpose systems can be used together with a program which is designed in accordance with this description. Alternatively, it may be understood that a particular apparatus dedicated to perform necessary method steps can be conveniently used. The structure required for these various systems will be apparent from the following explanation. Furthermore, the present disclosure does not depend on any particular programming language. It will be understood that various programming languages can be used to realize the technique explained here of the present disclosure.

Embodiment 1.

Figure 1:
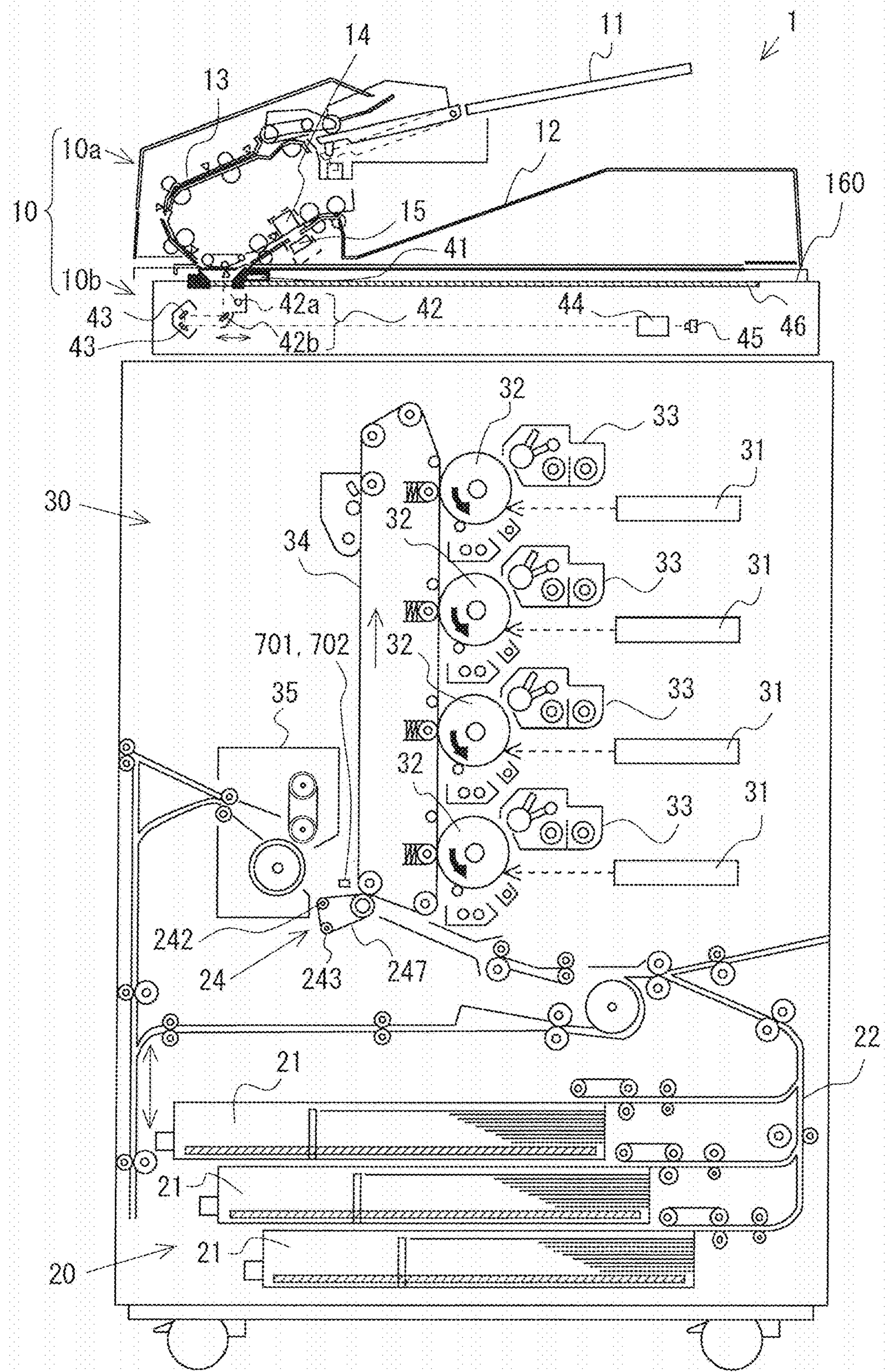
FIG. 1 is a schematic view for showing an example of the overall configuration of an image forming apparatus 1 in accordance with an embodiment 1 of the present disclosure.
Figure 2:
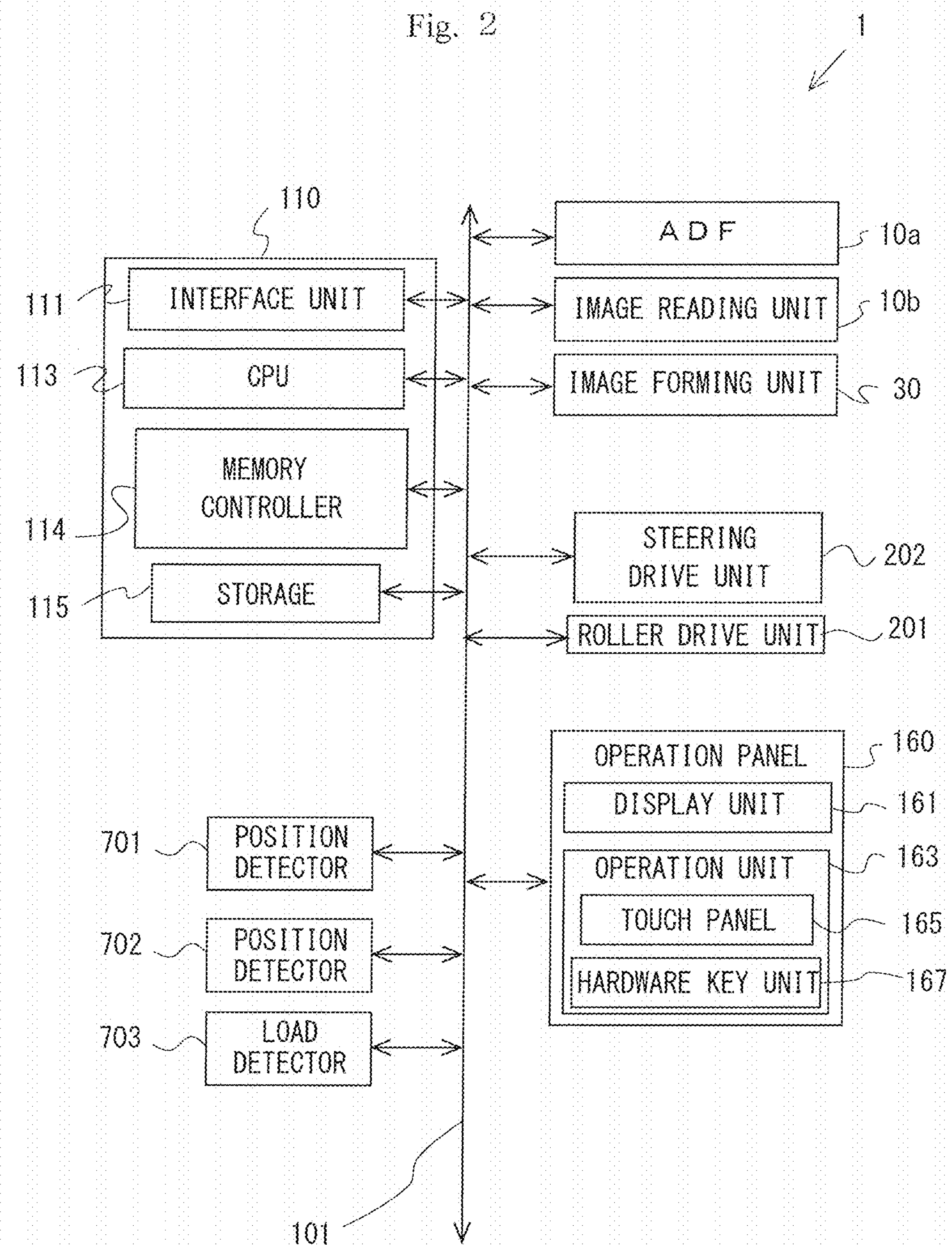
FIG. 2 is a block diagram of the image forming apparatus 1 in accordance with the embodiment 1.

FIG. 1 is a schematic view for showing an example of the overall configuration of an image forming apparatus 1 in accordance with an embodiment 1 of the present disclosure. FIG. 2 is a block diagram of the image forming apparatus 1 in accordance with the embodiment 1. As illustrated in FIG. 1, the image forming apparatus 1 includes an image reader 10, a paper feed unit 20, a paper feed unit 20 and an image forming unit 30. The paper feed unit 20 includes paper feed cassettes 21, a paper feed conveyance unit 22 and a second transfer unit 24. The paper feed cassettes 21 accommodate recording mediums having different sizes. The paper feed conveyance unit 22 is provided with various rollers to convey recording mediums accommodated in the paper feed cassettes 21 to the image forming site of the image forming unit 30. The second transfer unit 24 is located in the image formation site. The recording mediums are, for example, sheets or banner paper. The sheets are, for example, cutform paper, glossy paper, continuous form paper having opposite edges with punched holes at a constant pitch, and the like paper. The image forming unit 30 includes exposing devices 31, photoreceptor drums 32, development apparatuses 33, a first transfer belt 34 and a fixing unit 35. The image forming unit 30 supplies different color toners to the photoreceptor drums 32 for development with the exposing devices 31 based on image data of an original which is read by the image reading unit 10. The image forming unit 30 transfers, through the second transfer belt 24, toner images developed on the photoreceptor drums 32 from the first transfer belt 34 to a recording medium which is supplied from the paper feed unit 20. The image forming unit 30 fixes toner images on the recording medium by melting, by the fixing unit 35, the toner images transferred to the recording medium through the first transfer belt 34 and the second transfer unit 24.

The image reading unit 10 includes an ADF 10*a* and an image reading unit 10*b*. The ADF 10*a* includes an original tray 11, a catch tray 12, a paper path 13, a contact image sensor 14, a density reference member 15 and the like. The density reference member 15 is used to perform shading compensation of the ADF 10*a*. The original reading unit 10*b* is provided with an original illuminating unit 42, reflection mirrors 43, a condenser lens 44, a line image sensor 45, a platen glass 46 and the like. The image reading unit 10 separates and delivers originals set on the original tray 11 one by one, conveys the originals in the subscanning direction along the paper path 13 on which the contact image sensor 14 is arranged, and discharges the originals onto the catch tray 12. The original illuminating unit 42 is provided with a lamp 42*a* and a mirror 42*b*. While an original is conveyed in the subscanning direction along the paper path 13, a reading operation is repeatedly performed on a line-by-line basis in the main scanning direction with the original illuminating unit 42, the reflection mirrors 43, the condenser lens 44 and the line image sensor 45. A white reference plate 41 is located close to and opposite to the image reading unit 10*b*. The white reference plate 41 is used when performing shading compensation of the image reading unit 10*b*. The lamp 42*a* is lighted without an original between the image reading unit 10*b* and the white reference plate 41 to irradiate the white reference plate 41 with light. The light including the reflected light from the white reference plate 41 is received by the line image sensor 45 through the mirror 42*b*, the reflection mirrors 43 and the condenser lens 44.

As illustrated in FIG. 2, the image forming apparatus 1 includes a main cicuit 110, the ADF 10*a*, the image reading unit 10*b*, the image forming unit 30, a steering drive unit 202, a roller drive unit 201, an operation panel 160, a position detector 701, a position detector 702 and a load detector 703, which are connected to each other through a bus 101. The ADF 10*a* conveys an original to the image reading unit 10*b*. The image reading unit 10*b* reads the original conveyed by the ADF 10*a*. The image forming unit 30 forms an image on a recording medium such as a sheet based on the image data of the original read by the image reading unit 10*b*.

The operation panel 160 is located on the top of the image forming apparatus 1 and includes a display unit 161 and an operation unit 163. The operation panel 160 displays information about various modes and receives various operations. The display unit 161 is a display device which is, for example, a liquid crystal display device. The display unit 161 displays a command menu to a user, information about the image data of the original read by the image reading unit 10*b*, information about various modes or the like.

The operation unit 163 accepts a command input by user's operation. The operation unit 163 includes a hardware key unit 167. The hardware key unit 167 consists of a plurality of keys. The plurality of keys are used to input a variety of commands, characters, numerals and the like data. The operation unit 163 includes a touch panel 165. The touch panel 165 is located on the top of the display unit 161 to detect the coordinates of a position which is touched of the display screen of the display unit 161.

The main cicuit 110 includes one or more CPU 113 and an interface unit 111. The one or more CPU 113 is connected to the ADF 10*a*, the image reading unit 10*b*, the image forming unit 30, the roller drive unit 201, the steering drive unit 202 and the operation panel 160 to control the image forming apparatus 1. A storage 115 stores, through a memory controller 114, one or more control module which is executed by the one or more CPU 113 and data required for executing the one or more control module. The interface unit 111 is used to receive various data or instructions transmitted from outside, and transmit the processing results of the one or more CPU 113 to outside. Incidentally, the CPU 113 functions as a controller of the image forming apparatus 1 to control the roller drive unit 201 and the steering drive unit 202.

The fixing unit 35 is provided with an upper fixing unit and a lower fixing unit to form a fixing nip for fixing toner images on a recording medium. The upper fixing unit supplies heat to toner images through the fixing nip and consists of a fixing roller forming the fixing nip between it and a pressure roller of the lower fixing unit, a fixing roller provided with a heating unit, and a fixing endless belt running around these fixing rollers. The lower fixing unit is located opposite to the upper fixing unit to apply a pressure to toner images through the fixing nip.

Figure 3:
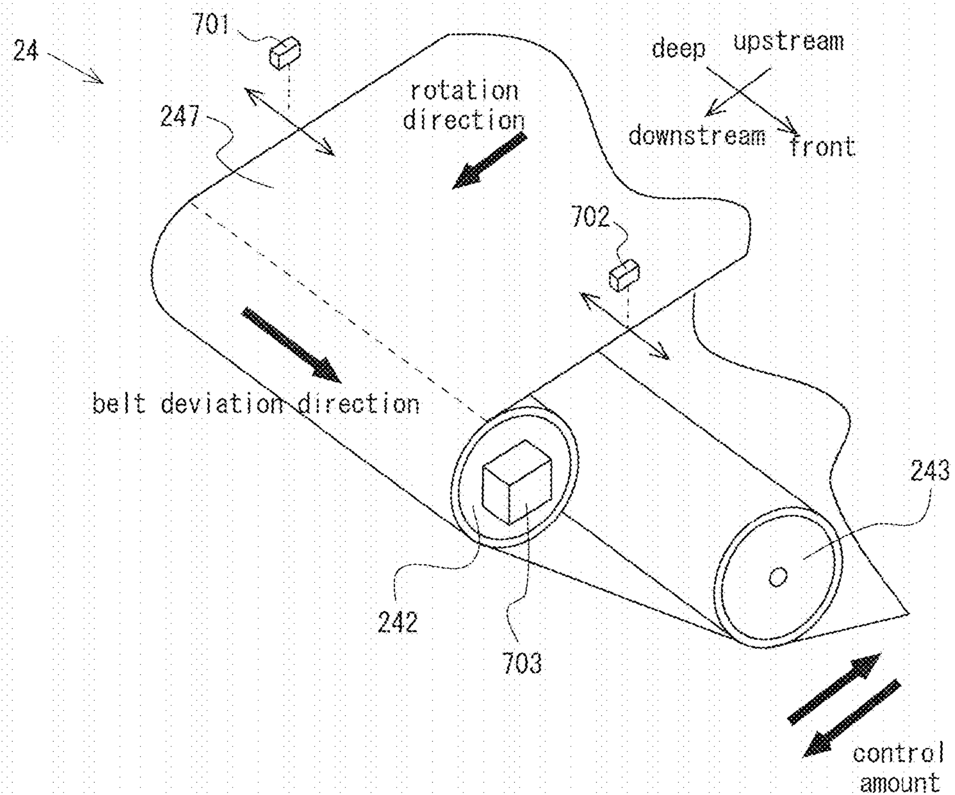
FIG. 3 is a perspective view for showing an arrangement example of a position detector 701, a position detector 702 and a load detector 703 in accordance with the embodiment 1.
Figure 4:
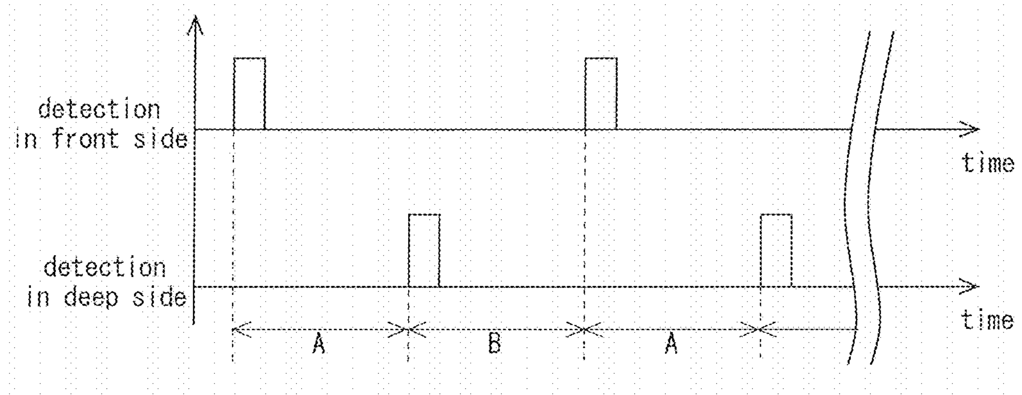
FIG. 4 is a schematic diagram for showing an detection example of the position detector 701 and the position detector 702 in accordance with the embodiment 1.
Figure 5:
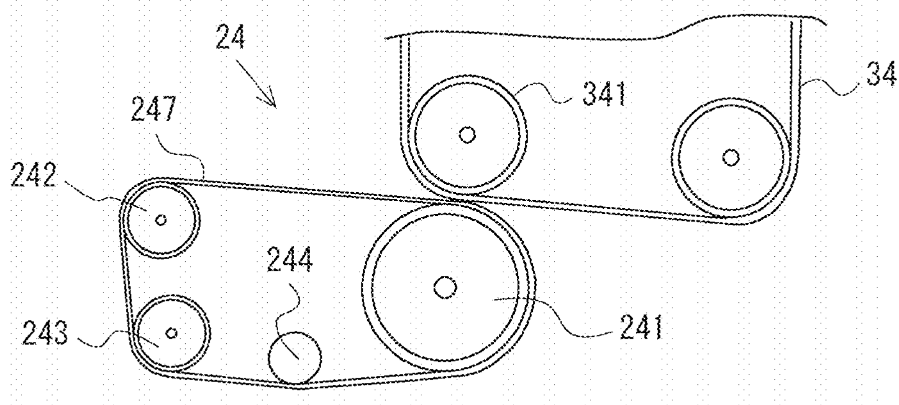
FIG. 5 is a view for showing an exemplary structure of a second transfer unit 24 in accordance with the embodiment 1.

FIG. 3 is a perspective view for showing an arrangement example of the position detector 701, the position detector 702 and the load detector 703 in accordance with the embodiment 1. FIG. 4 is a schematic diagram for showing an detection example of the position detector 701 and the position detector 702 in accordance with the embodiment 1. FIG. 5 is a view for showing an exemplary structure of the second transfer unit 24 in accordance with the embodiment 1. As illustrated in FIGS. 3 and 5, a second transfer belt 247 is wound around a drive roller 242 which rotationally drives the second transfer belt 247. The second transfer belt 247 is endless and rotationally driven. The position detector 701 and the position detector 702 are arranged along the axial direction of the drive roller 242 to detect the deviation of the second transfer belt 247. The position detector 701 and the position detector 702 consist, for example of an optical sensor to detect the deviation of the second transfer belt 247 without contact. The position detector 701 and the position detector 702 are provided in the deep and front sides of the second transfer belt 247 respectively.

The second transfer belt 247 is wound not only around the drive roller 242 but also around a steering roller 243. The steering roller 243 serves to correct the deviation of the second transfer belt 247 as detected by the position detector 701 and the position detector 702. Specifically, as illustrated in FIG. 4, the position detector 701 and the position detector 702 detect, as change amounts linked with the change of the friction coefficient μ of the second transfer belt 247, a first movement time A required for moving the second transfer belt 247 from a first point to a second point by the steering roller 243, and a second movement time B required for moving the second transfer belt 247 from the second point to the first point by the steering roller 243. More specifically, since each of the position detector 701 and the position detector 702 detects passing of the second transfer belt 247, the each of the position detector 701 and the position detector 702 detects that the second transfer belt 247 passes each time the second transfer belt 247 passes through the detection position of the each position detector. Accordingly, as illustrated in FIG. 4, the first movement time A is detected each time the second transfer belt 247 is detected in the deep side after detection in the front side. On the other hand, the second movement time B is detected each time the second transfer belt 247 is detected in the front side after detection in the deep side. Meanwhile, the second transfer belt 247, the first transfer belt 34, the fixing belt and the paper feed belt and the conveyor belt installed in the paper feed conveyance unit 22 are collectively referred to as the belt unless some of them is particularly specified.

The second transfer unit 24 is in contact with the first transfer belt 34 which is rotated by a second transfer counter roller 341 to form a transfer nip therebetween. The second transfer unit 24 is provided with a second transfer roller 241 and a driven roller 244 in addition to the drive roller 242 and the steering roller 243 as described above. The second transfer belt 247 is wound around the second transfer roller 241, the drive roller 242, the steering roller 243 and the driven roller 244. The drive roller 242 is rotated by the roller drive unit 201. The driving force generated by rotation of the drive roller 242 is transmitted to the second transfer roller 241, the steering roller 243 and the driven roller 244 through the second transfer belt 247. Accordingly, the second transfer roller 241, the steering roller 243 and the driven roller 244 rotate together with the drive roller 242. Also, the second transfer belt 247 is rotated by driving the drive roller 242 to convey a recording medium. The steering drive unit 202 is connected to one end of the steering roller 243 to incline the other end of the steering roller 243 in response to the instruction from the CPU 113 functioning as a controller and perform steering movement of the second transfer belt 247. Incidentally, for example, each of the roller drive unit 201 and the steering drive unit 202 includes a stepping motor.

The CPU 113 functioning as a controller determines the deterioration state of the second transfer belt 247 based on the change amount linked with the change of the friction coefficient μ of the second transfer belt 247 until a predetermined period elapses after starting the use of the second transfer belt 247. Specifically, the CPU 113 compares the time ratio between the first movement time A and the second movement time B when starting the use of the second transfer belt 247 with the corresponding time ratio when a predetermined period elapses. The CPU 113 determines that the greater the time ratio difference between when starting the use of the second transfer belt 247 and when a predetermined period elapses, the worse the deterioration state of the second transfer belt 247. As the change amount linked with the change of the friction coefficient μ of the second transfer belt 247 increases, the deterioration state of the second transfer belt 247 transits, for example, into any of a normal operation permission state, a faulty state and a failure state. Also, the CPU 113 can compare the time difference between the first movement time A and the second movement time B when starting the use of the second transfer belt 247 with the corresponding time difference when a predetermined period elapses. In this case, the CPU 113 determines that the greater the differential time difference between when starting the use of the second transfer belt 247 and when a predetermined period elapses, the worse the deterioration state of the second transfer belt 247.

Incidentally, each of the first movement time A and the second movement time B can be obtained as a one-way moving time, the average value of a plurality of one-way moving times, or the moving average time of one-way moving times. Also, the CPU 113 stores, in the storage 115, the change amount linked with the change of the friction coefficient μ of the second transfer belt 247 when the second transfer belt 247 is rotated until a predetermined period elapses after starting the use of the second transfer belt 247.

Furthermore, the drive roller 242 is provided with the load detector 703 at the end thereof. The load detector 703 is composed of a load cell to detect a thrust load of the drive roller 242. The load detector 703 detect, as change amounts linked with the change of the friction coefficient μ of the second transfer belt 247, a first thrust load required for moving the second transfer belt 247 from a first point to a second point by the steering roller 243, and a second thrust load required for moving the second transfer belt 247 from the second point to the first point by the steering roller 243. The CPU 113 functioning as a controller compares the thrust load difference between the first thrust load and the second thrust load when starting the use of the second transfer belt 247 with the corresponding differential thrust load when a predetermined period elapses. The CPU 113 determines that the greater the differential thrust load difference between when starting the use of the second transfer belt 247 and when a predetermined period elapses, the worse the deterioration state of the second transfer belt 247.

Incidentally, each of the first thrust load and the second thrust load can be obtained as the average value or the maximum value of thrust forces during a one-way movement, the average value or the maximum value of thrust forces during a plurality of one-way movements, or the moving average value of thrust forces during a one-way moving time.

Figure 6:
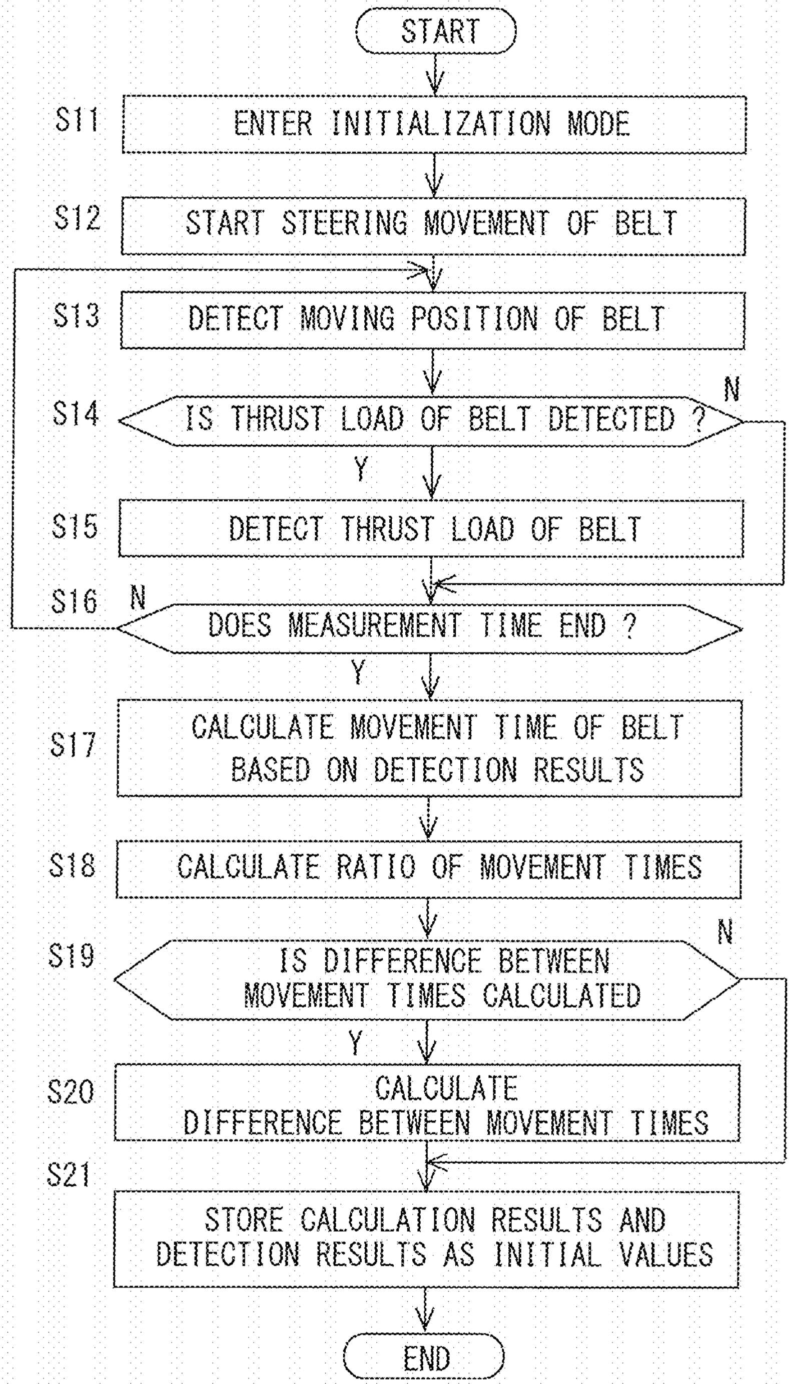
FIG. 6 is a flow chart for explaining an initial value setting process in accordance with the embodiment 1.

FIG. 6 is a flow chart for explaining an initial value setting process in accordance with the embodiment 1. In what follows, it is assumed that the belt to be steering moved is the second transfer belt 247. However, the present embodiment is not limited thereto. For example, the belt may be the first transfer belt 34 or the fixing belt provided in the fixing unit 35. Alternatively, the belt may be the paper feed belt, the conveyor belt installed in the paper feed conveyance unit 22, or the like belt. Also, the system is switched to the initialization mode to be described below when the system is shipped from a factory, when a service man or a user performs setting up operation of a new system, when a new system is powered up, or when printing is performed by a new system. Namely, the initialization mode is used when starting the use of the belt. Also, since the use of the belt is started in the initialization mode, the initial values stored in the initialization mode correspond to data which is used when starting the use of the belt.

In step S11, the CPU 113 enters the initialization mode. In step S12, the CPU 113 has the belt start a steering movement of the belt by the steering roller 243. In step S13, the CPU 113 has the position detector 701 and the position detector 702 detect the moving position of the belt. In step S14, the CPU 113 determines whether to have the load detector 703 detect the thrust load of the belt. If the CPU 113 determines to have the load detector 703 detect the thrust load of the belt (step S14: Y), the process proceeds to step S15. Conversely, if the CPU 113 determines not to have the load detector 703 detect the thrust load of the belt (step S14: N), the process proceeds to step S16. In step S15, the CPU 113 has the load detector 703 detect the thrust load of the belt, and the process proceeds to step S16. In step S16, the CPU 113 determines whether or not the measurement time ends. If the CPU 113 determines that a predetermined period elapses after starting the use of the belt so that the measurement time ends (step S16: Y), the process proceeds to step S17. Conversely, if the CPU 113 determines that a predetermined period does not elapse yet after starting the use of the belt so that the measurement time does not end (step S16: N), the process returns to step S13.

In step S17, the CPU 113 calculates the movement time of the belt based on the detection results of the movement position of the belt or the thrust load of the belt. In step S18, the CPU 113 calculates the ratio of the movement times of the belt. In step S19, the CPU 113 determines whether to calculate the difference between the movement times of the belt. if the CPU 113 determines that the difference between the movement times of the belt is calculated (step S19: Y), the process proceeds to step S20. Conversely, if the CPU 113 determines that the difference between the movement times of the belt is not calculated (step S19: N), the process proceeds to step S21. In step S20, the CPU 113 calculates the difference between the movement times of the belt, and the process proceeds to step S21. In step S21, the CPU 113 stores the calculation results and the detection results as initial values. Meanwhile, in the case where the inclination amount, i.e., the control amount of the steering roller 243 can take a plurality of values, this amount can be changed in accordance with the steering sensitivity, i.e., the response time of steering control, but it is preferred to associate the calculation results and the detection results with the control amount of the steering roller 243 when the calculation results and the detection results are stored as initial values.

Figure 7:
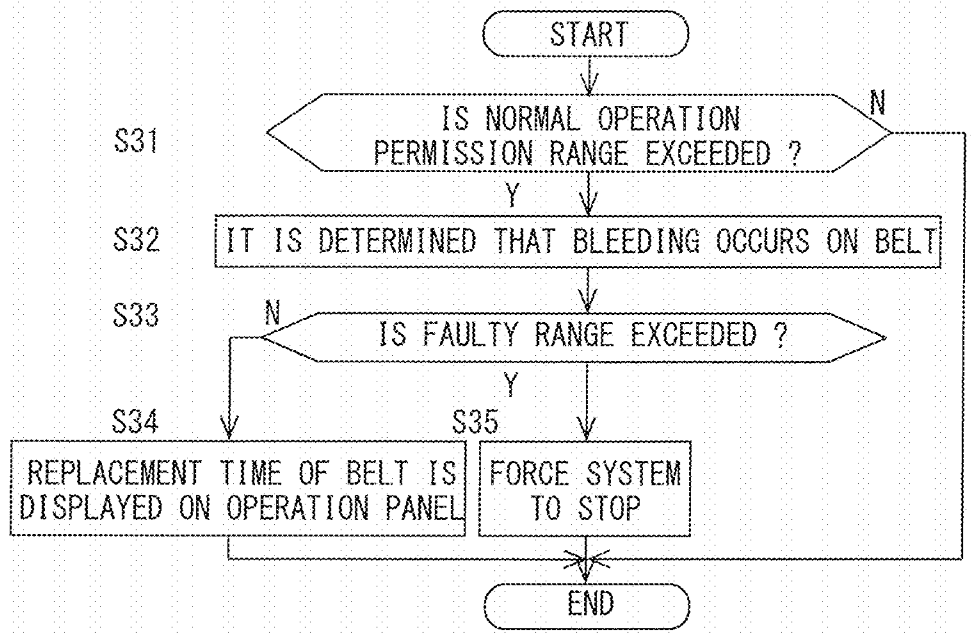
FIG. 7 is a flow chart for showing a determination process of a deterioration state of a second transfer belt 247 in accordance with the embodiment 1.

FIG. 7 is a flow chart for showing a determination process of a deterioration state of the belt in accordance with the embodiment 1. Meanwhile, in the deterioration state determination process of the belt, the deterioration state of the belt is determined in accordance with the result of comparing the change amount linked with the change of the friction coefficient μ of the belt until a predetermined period elapses after starting the use of the belt between when starting the use of the belt and when the predetermined period elapses. Incidentally, while the predetermined period is not particularly limited, the predetermined period is a period after starting rotation of the belt for the purpose of forming an image on a recording medium, and may be a predetermined cycle.

In step S31, the CPU 113 determines whether or not a normal operation permission range is exceeded by the change amount linked with the change of the friction coefficient μ of the belt until a predetermined period elapses after starting the use of the belt. If the CPU 113 determines that the normal operation permission range is exceeded by the change amount linked with the change of the friction coefficient μ of the belt until a predetermined period elapses after starting the use of the belt (step S31: Y), the process proceeds to step S32. Conversely, if the CPU 113 determines that the normal operation permission range is not exceeded by the change amount linked with the change of the friction coefficient μ of the belt until a predetermined period elapses after starting the use of the belt (step S31: N), the process is finished. In step S32, the CPU 113 determines that bleeding occurs on the belt. In step S33, the CPU 113 determines whether or not a faulty range is exceeded by the change amount linked with the change of the friction coefficient μ of the belt until a predetermined period elapses after starting the use of the belt. If the CPU 113 determines that the faulty range is exceeded by the change amount linked with the change of the friction coefficient μ of the belt until a predetermined period elapses after starting the use of the belt (step S33: Y), the process proceeds to step S35. Conversely, if the CPU 113 determines that the faulty range is not exceeded by the change amount linked with the change of the friction coefficient μ of the belt until a predetermined period elapses after starting the use of the belt (step S33: Y), the process proceeds to step S34 in which the replacement time of the belt is displayed on the operation panel 160, and the process is finished. In step S35, the CPU 113 forces the system to stop, and the process is finished.

As explained above, if the faulty range is exceeded by the change amount linked with the change of the friction coefficient μ of the belt until a predetermined period elapses after starting the use of the belt, the system is forced to stop. This is because, if steering moving of the belt is continued with creep deformation, an unintended load may be generated in the image forming apparatus. Specifically, the endurance of the belt made of rubber or the like as row material can be determined by deterioration of the belt due to ozone or ultraviolet light, abrasion or deformation of the belt and increase of the friction coefficient μ of the belt due to occurrence of bleeding. Endurance improving measure for the belt includes prevention of deterioration by management of materials or components in manufacturing conditions, and prevention of abrasion or deformation by devising the structure to realize low stress. However, while bleeding occurrence is managed by combination of additives or manufacturing conditions, it cannot perfectly be controlled by this measure. Accordingly, as a result of an increased friction coefficient μ of the belt due to bleeding occurrence, motor driving torque increases as well as the stress applied to the belt during steering movement, so that the belt is deformed to necessitate an endurance measure.

More specifically, the friction coefficient μ between the belt and a roller increases due to bleeding of the belt or the roller to increase the force required for peeling off the belt from the roller. The motor drive torque at start-up is therefore increased. Also, since the friction coefficient μ between the belt and a roller increases due to bleeding of the belt or the roller, the belt does not easily move in the axial direction of the roller so that the steering responsiveness of the belt is lowered. Accordingly, since it takes a longer time to steer the belt in one side, there occurs a stress difference to the belt between the front side and the deep side. As a result, the creep deformation of the belt occurs.

Accordingly, in the case of the image forming apparatus 1 of the present embodiment, the deterioration state of the belt is determined on the basis of the change amount linked with the change of the friction coefficient μ of the belt until a predetermined period elapses after starting the use of the belt. This makes it possible to confirm an increasing tendency of the friction coefficient μ of the belt due to bleeding which is a factor of causing creep deformation. It is therefore possible to appropriately determine replacement timing of the belt.

Also, in the case of the image forming apparatus 1 according to the present embodiment, the movement time ratio between the second point and the first point is compared between when starting the use of the belt and when a predetermined period elapses as the change amount linked with the change of the friction coefficient μ of the belt. Thereby, since the movement time ratio is used for comparison, the calculation is not influenced by the presence of dispersion in individual components or the environment in which the belt is installed, even if the image forming apparatus 1 has a different initial state of the belt and a different alignment accuracy of the conveyance structure. Accordingly, even if there is a mechanical difference in the conveyance structure, it is possible to determine whether or not the friction coefficient μ of the belt changes after starting the use of the belt.

Also, in the case of the image forming apparatus 1 according to the present embodiment, it is determined that the greater the time ratio difference between when starting the use of the belt and when a predetermined period elapses, the worse the deterioration state of the belt. Accordingly, the worsening trend of the deterioration state of the belt is determined by the time ratio difference. It is therefore possible to determine the trend of the deterioration state of the belt.

Furthermore, in the case of the image forming apparatus 1 according to the present embodiment, the movement time difference between the second point and the first point is compared between when starting the use of the belt and when a predetermined period elapses as the change amount linked with the change of the friction coefficient μ of the belt. Accordingly, since the movement time difference is used for comparison, the calculation is not influenced by the presence of dispersion in individual components or the environment in which the belt is installed, even if the image forming apparatus 1 has a different initial state of the belt and a different alignment accuracy of the conveyance structure. Accordingly, even if there is a mechanical difference in the conveyance structure, it is possible to determine whether or not the friction coefficient μ of the belt changes after starting the use of the belt.

Also, in the case of the image forming apparatus 1 according to the present embodiment, it is determined that the greater the differential time difference between when starting the use of the belt and when a predetermined period elapses, the worse the deterioration state of the belt. Accordingly, the worsening trend of the deterioration state of the belt is determined by the differential time difference. It is therefore possible to determine the degree of the deterioration state of the belt.

Furthermore, in the case of the image forming apparatus 1 according to the present embodiment, each of the first movement time A and the second movement time B can be obtained as a one-way moving time, the average value of a plurality of one-way moving times, or the moving average time of one-way moving times. Accordingly, each of the first movement time A and the second movement time B can be obtained without using, as arithmetic parameters, information about the environment in which the belt is installed or alignment accuracy of the conveyance structure including components or the belt. Thereby, since operation can be performed simply with the movement times of the belt due to steering movement as operation parameters of the change amount linked with the change of the friction coefficient μ of the belt, operation can be performed by paying attention to the change in the friction coefficient μ of the belt as a factor of changing the movement time of the belt.

Furthermore, in the case of the image forming apparatus 1 according to the present embodiment, the thrust load difference between the second point and the first point is compared between when starting the use of the belt and when a predetermined period elapses as the change amount linked with the change of the friction coefficient μ of the belt. Accordingly, since the thrust load difference is used for comparison, the calculation is not influenced by the presence of dispersion in individual components or the environment in which the belt is installed, even if the image forming apparatus 1 has a different initial state of the belt and a different alignment accuracy of the conveyance structure. Accordingly, even if there is a mechanical difference in the conveyance structure, it is possible to determine whether or not the friction coefficient μ of the belt changes after starting the use of the belt.

Also, in the case of the image forming apparatus 1 according to the present embodiment, it is determined that the greater the differential thrust load difference between when starting the use of the belt and when a predetermined period elapses, the worse the deterioration state of the belt. Accordingly, the worsening trend of the deterioration state of the belt is determined by the differential thrust load difference. It is therefore possible to determine the degree of the deterioration state of the belt.

Furthermore, in the case of the image forming apparatus 1 according to the present embodiment, each of the first thrust load and the second thrust load can be obtained as the average value or the maximum value of thrust forces during a one-way movement, the average value or the maximum value of thrust forces during a plurality of one-way movements, or the moving average value of thrust forces during a one-way moving time. Accordingly, each of the first thrust load and the second thrust load can be obtained without using, as arithmetic parameters, information about the environment in which the belt is installed or alignment accuracy of the conveyance structure including components or the belt. Thereby, since operation can be performed simply with the thrust forces of the belt due to steering movement as operation parameters, operation can be performed by paying attention to the change in the friction coefficient μ of the belt as a factor of changing the thrust forces of the belt.

Furthermore, the image forming apparatus 1 of the present embodiment stores, in the storage 115, the change amount linked with the change of the friction coefficient μ of the belt when the belt is rotationally driven until a predetermined period elapses after starting the use of the belt. It is therefore possible to store the change amount linked with the change of the friction coefficient μ of the belt before bleeding of the belt occurs. Accordingly, it is possible to easily prepare initial values for use in determining the deterioration state of the belt.

Embodiment 2.

In this embodiment 2, similar elements are given similar references as in the embodiment 1, and therefore no redundant description is repeated. The embodiment 2 is directed to the explanation of the process of performing estimation on the detection results of the position detector 701 and position detector 702 or the load detector 703 in the structure of the embodiment 1.

Figure 8:
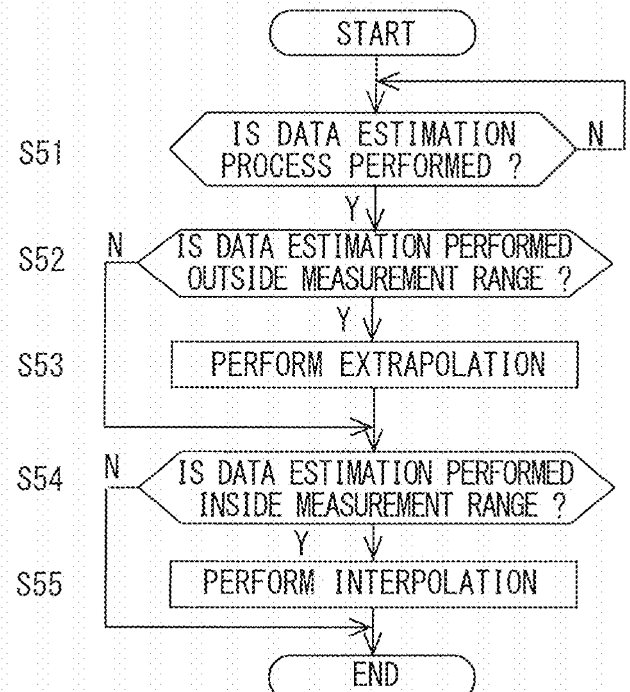
FIG. 8 is a flow chart explaining a data estimation process in accordance with an embodiment 2.

FIG. 8 is a flow chart explaining a data estimation process according to the embodiment 2. The CPU 113 functioning as a controller predicts the deterioration state of the second transfer belt 247 based on values which is obtained by performing data estimation of the change amount linked with the change of the friction coefficient μ of the second transfer belt 247. In step S51, the CPU 113 determines whether to perform the data estimation process. If the CPU 113 determines that the data estimation process is performed (step S51: Y), the process proceeds to step S52. Conversely, if the CPU 113 determines that the data estimation process is not performed (step S51: N), the process in step S51 is repeated. In step S52, the CPU 113 determines whether to perform data estimation outside the measurement range. If the CPU 113 determines that data estimation is performed outside the measurement range (step S52: Y), the process proceeds to step S53 in which an extrapolation process is performed, and then the process proceeds to step S54. Conversely, if the CPU 113 determines that data estimation is not performed outside the measurement range (step S52: N), the process proceeds to step S54. In step S54, the CPU 113 determines whether to perform data estimation inside the measurement range. If the CPU 113 determines that data estimation is performed inside the measurement range, the process proceeds to step S55 in which an interpolation process is performed, and then the process is finished. Conversely if the CPU 113 determines that data estimation is not performed inside the measurement range, the process is finished.

As has been discussed above, the image forming apparatus 1 according to the present embodiment predicts the deterioration state of the belt based on values which is obtained by performing data estimation of the change amount linked with the change of the friction coefficient μ of the belt. Accordingly, in the case where the extrapolation process is performed as the data estimation process, it is possible to predict the deterioration state of the belt when the steering movement of the belt is continued as it is. On the other hand, in the case where the interpolation process is performed as the data estimation process, it is possible to determine the deterioration state of the belt in the area where detection is not performed by the position detector 701 and position detector 702 or the load detector 703. Accordingly, it is possible to expand the area where the deterioration state of the belt can be determined.

As has been discussed above, in accordance with the embodiments 1 and 2, the deterioration state of the belt can be detected in advance of creep deformation of the belt.

The image forming apparatus 1 have been explained based on the embodiments in accordance with the present disclosure. However, it is not intended to limit the present disclosure to the precise form described, and obviously many modifications and variations are possible without departing from the scope of the invention.

For example, while the position detector 701 and the position detector 702 are composed of optical sensors in the above explanation, the present invention is not limited thereto. For example, the position detector 701 and the position detector 702 may be composed of actuators to detect the belt by coming in direct contact with the edge of the belt.

Also, as illustrated in the example shown in FIG. 3, the position detector 702 is arranged alone in the front side, and the position detector 701 is arranged alone in the deep side. However, the present invention is not limited thereto. For example, the position detector 701 and the position detector 702 may be provided in plurality respectively. Furthermore, the arrangement positions of the position detector 701 and the position detector 702 are not limited to the front and deep sides. For example, they can be arranged in two different positions in order to detect the second transfer belt 247 each time the second transfer belt 247 moves between the two positions.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

Although embodiments of the present invention have been described and illustrated in detail, the disclosed embodiments are made for purposes of illustration and example only and not limitation. The scope of the present disclosure should be interpreted by terms of the appended claims.

What is claimed is:

1. An image forming apparatus which forms an image on a recording medium, comprising:

a belt which is endless and rotationally driven;

a drive roller about which the belt is wound to rotationally drive the belt;

at least two position detectors which are arranged along an axial direction of the drive roller to detect deviation of the belt;

a steering roller about which the belt is wound and which corrects the deviation of the belt detected by the position detectors; and a controller which controls the steering roller, wherein the controller determines a deterioration state of the belt based on a change amount obtained by measuring each of at least two parameters multiple times over a predetermined time period after starting use of the belt, the change amount being linked with change of a friction coefficient of the belt.

2. The image forming apparatus of claim 1 wherein the position detector detects a first movement time required for moving the belt from a first point to a second point by the steering roller as a first parameter of the at least two parameters and a second movement time required for moving the belt from the second point to the first point by the steering roller as a second parameter of the at least two parameters and wherein the controller compares a time ratio between the first movement time and the second movement time when starting the use of the belt with a corresponding time ratio when the predetermined time period elapses.

3. The image forming apparatus of claim 2 wherein the controller determines that the greater the time ratio difference between when starting the use of the belt and when the predetermined time period elapses, the worse the deterioration state of the belt.

4. The image forming apparatus of claim 2 wherein each of the first movement time and the second movement time is obtained as a one-way moving time, an average value of a plurality of one-way moving times, or a moving average time of one-way moving times.

5. The image forming apparatus of claim 1 wherein the position detector detects a first movement time required for moving the belt from a first point to a second point by the steering roller as a first parameter of the at least two parameters and a second movement time required for moving the belt from the second point to the first point by the steering roller as a second parameter of the at least two parameters and wherein the controller compares a time difference between the first movement time and the second movement time when starting the use of the belt with a corresponding time difference when the predetermined time period elapses.

6. The image forming apparatus of claim 5 wherein the controller determines that the greater the differential time difference between when starting the use of the belt and when the predetermined time period elapses, the worse the deterioration state of the belt.

7. The image forming apparatus of claim 1 further comprising:

a load detector provided at an end of the drive roller to detect a thrust load of the drive roller, wherein the load detector detects a first thrust load required for moving the belt from a first point to a second point by the steering roller as a first parameter of the at least two parameters and a second thrust load required for moving the belt from the second point to the first point by the steering roller as a second parameter of the at least two parameters and wherein the controller compares a thrust load difference between the first thrust load and the second thrust load when starting the use of the belt with a corresponding time difference when the predetermined time period elapses.

8. The image forming apparatus of claim 7 wherein the controller determines that the greater the differential thrust load difference between when starting the use of the belt and when the predetermined time period elapses, the worse the deterioration state of the belt.

9. The image forming apparatus of claim 7 wherein each of the first thrust load and the second thrust load is obtained as an average value or a maximum value of thrust forces during a one-way movement, an average value or a maximum value of thrust forces during a plurality of one-way movements, or a moving average value of thrust forces during a one-way moving time.

10. The image forming apparatus of claim 1 wherein the controller predicts the deterioration state of the belt based on values which are obtained by performing data estimation of the change amount linked with change of the friction coefficient of the belt.

11. The image forming apparatus of claim 1 further comprising:

a storage which stores the change amount linked with change of the friction coefficient of the belt, wherein the controller stores, in the storage, the change amount linked with the change of the friction coefficient of the belt when the belt is rotationally driven until the predetermined time period elapses after starting the use of the belt.

12. An image forming apparatus comprising:

a belt which is endless and rotationally driven;

a drive roller about which the belt is wound to rotationally drive the belt;

a position detector which is arranged along an axial direction of the drive roller to detect deviation of the belt;

a steering roller about which the belt is wound and which corrects the deviation of the belt detected by the position detector; and a controller which controls the steering roller, a non-transitory recording medium storing a computer readable program causing a computer incorporated in the image forming apparatus that forms an image on a recording medium to perform:

determining a deterioration state of the belt based on a change amount obtained by measuring each of at least two parameters multiple times over a predetermined time period after starting use of the belt, the change amount being linked with change of a friction coefficient of the belt.

* * * * *